(12) United States Patent
Nilsson et al.

(10) Patent No.: US 11,140,205 B2
(45) Date of Patent: Oct. 5, 2021

(54) CONGESTION RESPONSE FOR TIMELY MEDIA DELIVERY

(71) Applicant: BRITISH TELECOMMUNICATIONS PUBLIC LIMITED COMPANY, London (GB)

(72) Inventors: Michael Nilsson, London (GB); Stephen Appleby, London (GB); Yousif Humeida, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/981,067

(22) PCT Filed: Mar. 15, 2019

(86) PCT No.: PCT/EP2019/056594
§ 371 (c)(1),
(2) Date: Sep. 15, 2020

(87) PCT Pub. No.: WO2019/185372
PCT Pub. Date: Oct. 3, 2019

(65) Prior Publication Data
US 2020/0412783 A1    Dec. 31, 2020

(30) Foreign Application Priority Data
Mar. 27, 2018    (EP) .................................... 18164295

(51) Int. Cl.
*G06F 15/16*    (2006.01)
*H04L 29/06*    (2006.01)
(Continued)

(52) U.S. Cl.
CPC ........ *H04L 65/601* (2013.01); *H04L 43/0829* (2013.01); *H04L 69/326* (2013.01)

(58) Field of Classification Search
CPC .. H04L 65/601; H04L 43/0829; H04L 69/326
(Continued)

(56) References Cited

U.S. PATENT DOCUMENTS 6,105,064 A    8/2000  Davis et al.
7,684,319 B2 *  3/2010  Kumar .................... H04L 47/27
                                                370/229
(Continued)

FOREIGN PATENT DOCUMENTS

CN    105978822       9/2016
CN    105978822 A     9/2016
(Continued)

OTHER PUBLICATIONS

International Search Report and Written Opinion of the ISA for PCT/EP2019/056594, dated Jun. 14, 2019, 14 pages.
(Continued)

*Primary Examiner* — Duyen M Doan
(74) *Attorney, Agent, or Firm* — Nixon & Vanderhye P.C.

(57) ABSTRACT

In examples of the present invention, delivery of a segment of content is done using an initial congestion window, preferably chosen to give a delivery rate that ensures timely delivery of that segment. However, under high levels of packet loss, the delivery rate may not be sufficient. Hence, at any stage during delivery of a segment, the actual delivery rate is measured, and used, together with the previous congestion window size, the amount of content segment data still to be delivered, and the time left for delivery, to calculate an updated congestion window. The remainder of the segment is then delivered using this revised congestion window.

18 Claims, 4 Drawing Sheets

(51) Int. Cl.
    *H04L 12/26*     (2006.01)
    *H04L 29/08*     (2006.01)

(58) Field of Classification Search
    USPC .................................................. 709/203, 219
    See application file for complete search history.

(56) References Cited

U.S. PATENT DOCUMENTS

| | | |
|---|---|---|
| 2007/0076621 A1 | 4/2007 | Malhotra et al. |
| 2013/0235729 A1* | 9/2013 | Mutoh .................... H04L 47/27 370/237 |
| 2015/0236966 A1* | 8/2015 | Francini .............. H04L 43/0864 370/235 |
| 2018/0123959 A1* | 5/2018 | Maslak ................ H04L 47/125 |
| 2019/0166055 A1* | 5/2019 | De Vleeschauwer .. H04L 65/80 |

FOREIGN PATENT DOCUMENTS

| | | |
|---|---|---|
| EP | 3 285 454 | 2/2018 |
| EP | 3 285 454 A1 | 2/2018 |
| WO | 2014/155031 | 10/2014 |
| WO | 2015/078491 | 6/2015 |
| WO | 2015/078491 A1 | 6/2015 |

OTHER PUBLICATIONS

Extended Search Report for EP18164295.0, dated Jul. 3, 2018, 8 pages.
Combined Search and Examination Report for GB1804891.8, dated Sep. 24, 2018, 6 pages.
Gerla et al., "TCP Westwood: Congestion Window Control Using Bandwidth Estimation", IEEE explore, Global Telecommunications Conference, 2001, GLOBECOM '01, vol. 3, pp. 1698-1702.
Claeys Maxim et al: "Deadline-aware TCP congestion control for video streaming services", 2016 12th International Conference on Network and Service Management (CNSM), IFI P, Oct. 31, 2016 (Oct. 31, 2016), pp. 100-108, XP033045133, 001: 10.1109/CNSM.2016.7818405 [retrieved on Jan. 13, 2017] (9 pgs.).
Combined Search and Exam Report for GB1804891.8 dated Sep. 24, 2018 (6 pgs.).
European Search Report EP18164295.0 dated Jul. 3, 2018 (8 pgs.).
Gerla et al., "TCP Westwood: Congestion Window Control Using Bandwidth Estimation", published 2001, IEEE Global Telecommunications Conference (GLOBECOM'OI), vol. 3, pp. 1698-1702. Available from https://ieeexplore.ieee.org/stamp/stamp.jsp?arnumber=965869 [accessed on Sep. 13, 2018] (5 pgs.)
International Search Report and Written Opinion re PCT/EP2019/056594 dated Jun. 14, 2019 (14 pgs.).
Joerg Widmer et al: "A Survey on TCP-Friendly Congestion Control", IEEE Network, IEEE Service Center, New York, NY, US, vol. 15, No. 3, May 1, 2001 (May 1, 2001), pp. 28-37, XP011092087, ISSN: 0890-8044 (10 pgs.).

\* cited by examiner

CONGESTION RESPONSE FOR TIMELY MEDIA DELIVERY

This application is the U.S. national phase of International Application No. PCT/EP2019/056594 filed Mar. 15, 2019 which designated the U.S. and claims priority to EP Patent Application No. 18164295.0 filed Mar. 27, 2018, the entire contents of each of which are hereby incorporated by reference.

TECHNICAL FIELD

This invention relates to a method and apparatus for managing the congestion response during the delivery of a media sequence over a network.

BACKGROUND

There is an increasing demand for delivering media content (e.g. audio and/or video content) over networks.

One approach for delivering a stream of media content over a network is to segment the media content stream into a plurality of temporal segments. Each segment can then be communicated over the network in the form of a series of data packets. One class of techniques in which a stream of content is segmented into temporal segments is adaptive bitrate delivery.

In adaptive bitrate delivery, a media content stream is separately encoded at multiple bitrates to produce multiple encoded streams. If the media content comprises audio and video content (so that the media stream comprises an audio stream and a video stream), each of the audio and video streams may be encoded separately and at multiple bitrates to produce a plurality of encoded video streams and a plurality of encoded audio streams. Each encoded media stream is segmented into a plurality of temporal segments. Each temporal segment may contain between 2 and 15 seconds' worth of decoded media content, for example. The segmentation of the media content may occur before or after the media stream(s) are encoded. The segments of media content are then communicated over the network to a receiver device as a series of data packets.

The bitrate of each segment of media content delivered to the receiver can be selected from the set of bitrates at which the content is encoded. Thus, the receiver device may receive segments of media content at different encoded bitrates. This bitrate may be requested by the receiver or selected by the sender.

A problem associated with delivering segmented media content over a network is that the delivery time of a given segment may be highly variable. Though adaptive bitrate delivery can operate to adjust the quality (i.e. encoded bitrate) of a delivered content stream in real-time to take account of available network resources, it still often suffers from unpredictable and variable delivery times for given segments of content. This variability may arise in part from the nature of the communication protocols used to deliver the media content.

For example, the delivery of media content over a distributed computer network like the internet typically implements the use of TCP as the transport protocol.

TCP was designed to achieve reliable transmission of data over a network with an aim of avoiding adversely affecting the network throughput of competing TCP traffic flows. In accordance with the TCP protocol, packets that are lost in transmission are retransmitted in an attempt to achieve reliable delivery. In addition, the TCP protocol implements a congestion response, or congestion avoidance, scheme. As part of this scheme, the transmission rate of packets from a sender to a receiver over the network is typically reduced following a detected packet loss on the assumption that the packet loss was caused by congestion on the network.

The transmission rate of packets into the network may be controlled by a parameter known as the congestion window (which may be denoted herein as CWND). The congestion window may indicate the maximum permissible number of packets that at any given time have been communicated into the network but not yet acknowledged by the receiver. A TCP sender (e.g. a media content server) may maintain a congestion window for each receiver (e.g. a content client) connection. Following a detected packet loss over a given connection, the TCP sender typically takes rapid action to significantly decrease the size of the congestion window in order to reduce the transmission rate for that connection. This in turn causes the transmission rate of packets during delivery of a given segment of content to be variable and highly contingent on the packet loss rate suffered during delivery of that segment.

If the delivery time of a segment of content is variable and unpredictable, then the performance of the media playout at the receiver may be adversely affected by buffering delays and playout stalling. One approach to minimise the risk of these performance defects is to include within the receiver large amounts of buffering. However, this approach may in turn incur a performance penalty of high end-to-end latency due to the time required to adequately fill the buffer.

SUMMARY

According to one aspect of the present disclosure there is provided a method of delivering media content over a network, said media content comprising a plurality temporal segments, and each temporal segment comprising a plurality of data packets, said method comprising:
a) determining a time interval for delivery of a segment;
b) calculating an initial congestion window size for the delivery of the segment, wherein said initial congestion window is dependent on the time interval;
c) delivering a first portion of the segment using the initial congestion window;
d) measuring a first rate for the delivery of the first portion of the segment;
e) calculating an updated congestion window size in dependence on the initial congestion window size, the first rate, the amount of data in the segment remaining to be delivered, and the time remaining for delivery of the segment;
f) delivering a further portion of the segment using the updated congestion window size.

All the data packets in the first portion of the segment may be delivered using the initial congestion window.

The first rate may be the average delivery rate over the first portion. The first rate may be a weighted average of the delivery rate biased towards more recently delivered packets.

The time remaining for delivery of the segment may be the time interval minus the time taken to deliver the first portion.

The updated congestion window size, $CWND_{target}$, may be given by:

$$CWND_{target} = \frac{CWND}{R_{measured}} \times \frac{D_{remaining}}{\Delta T_d}$$

where CWND is the initial congestion window size, $R_{measured}$ is the first rate, $D_{remaining}$ is the amount of data in the segment remaining to be delivered, and $\Delta T_n$ the time remaining for delivery of the segment.

According to second aspect of the present disclosure there is provided a server for delivering media content over a network, said media content comprising a plurality temporal segments, and each temporal segment comprising a plurality of data packets, said server comprising:

a dispatch unit configured to determine a time interval for delivery of a segment;

a congestion window unit configured to calculate an initial congestion window size for the delivery of the segment, wherein said initial congestion window is dependent on the time interval;

the dispatch unit further configured deliver a first portion of the segment using the initial congestion window;

a delivery rate unit configured to measure a first rate for the delivery of the first portion of the segment; and wherein the congestion window unit is further configured to calculate an updated congestion window size in dependence on the initial congestion window size, the first rate, the amount of data in the segment remaining to be delivered, and the time remaining for delivery of the segment, and wherein the dispatch unit is further configured to deliver a further portion of the segment using the updated congestion window size.

BRIEF DESCRIPTION OF THE DRAWINGS

For a better understanding of the invention reference will now be made by way of example only to the following drawings, in which.

DESCRIPTION OF PREFERRED EMBODIMENTS

The present invention will now be described with reference to particular examples. The invention is not, however, limited to such examples.

Examples of the present invention present a method of delivering media content over a network. The media content could be video content (e.g. in the form of a video sequence), audio content (e.g. in the form of an audio sequence) or it may include audio and video content (i.e. the media content could be multimedia content). The media content comprises a plurality of temporal segments. Each segment may contain data for a short temporal duration at playout (e.g. 2 to 15 playout seconds' worth of data). The number of data packets per segment of media content is dependent on the duration of the temporal segment, the encoded bit rate and the size of each data packet, and may range from several tens of data packets to thousands of data packets. For example, with temporal segments of 10 s duration, an encoded bit rate of 1 MBit/s, and a data packet size of 1500 bytes, each media content segment of 10 s duration would comprise 833 data packets (10×1000000/(1500×8)).

In examples of the present invention, delivery of a segment of content is done using an initial congestion window, preferably chosen to give a delivery rate that ensures timely delivery of that segment. However, under high levels of packet loss, the delivery rate may not be sufficient. Hence, at any stage during delivery of that segment, the actual delivery rate, $R_{measured}$, is measured, and used, together with the original congestion window size, the amount of data in the segment still to be delivered, and the time left for delivery of that segment, to calculate an updated congestion window. The remainder of the segment is then delivered using this updated congestion window.

Example embodiments of the present disclosure will now be described. For the purposes of clarity, in the following examples media content is delivered over a network in accordance with an HTTP and underlying TCP protocol using adaptive bit rate delivery. The HTTP protocol could for example be an HTTP Adaptive Streaming protocol, such as the HTTP Live Streaming (HLS) protocol, MPEG-DASH, SmoothStreaming, Adobe HTTP Dynamic Streaming etc. The TCP protocol could be any suitable protocol, such as TCP Reno, TCP New Reno, TCP Cubic, TCP Tahoe, TCP Vegas etc.

Figure 1:
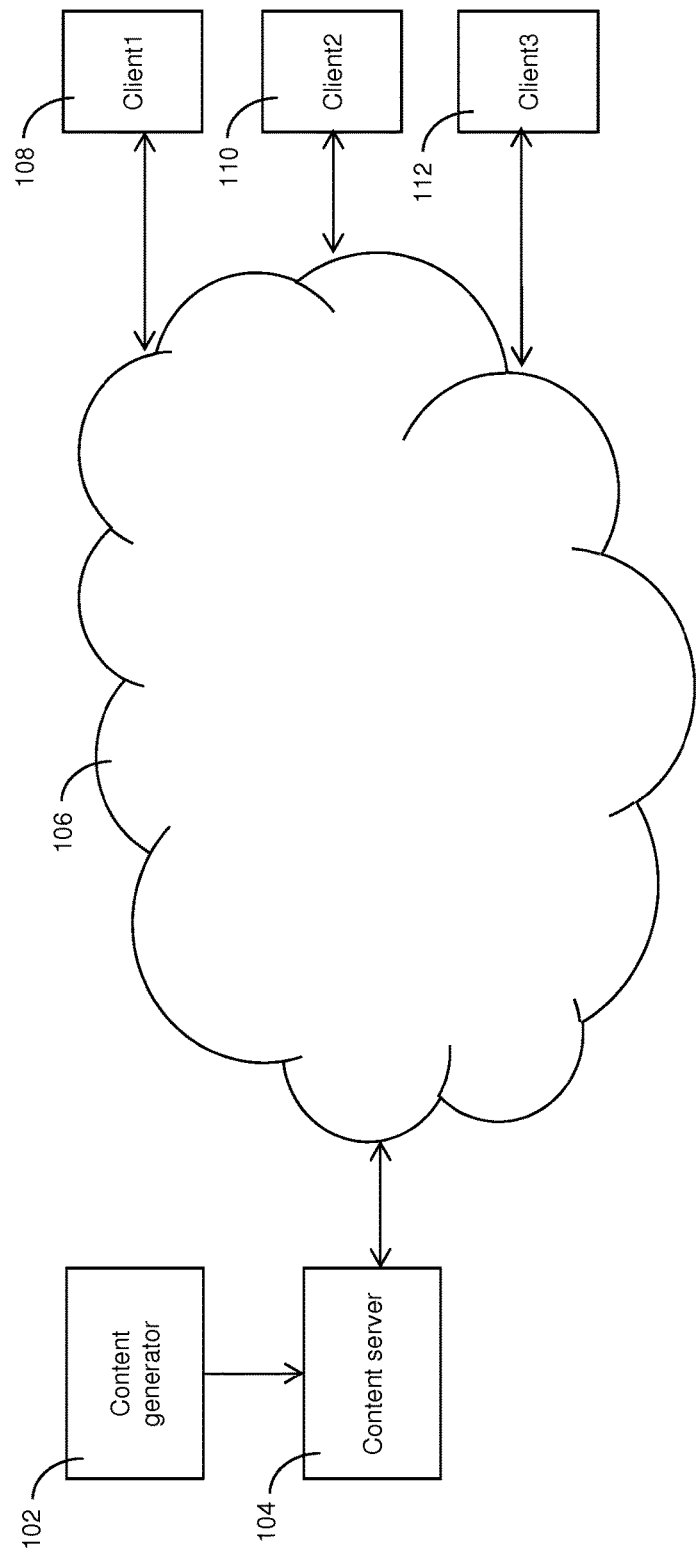
FIG. 1 shows an example of a communication network.

FIG. 1 shows an example of a communication system 100. The system comprises a content sender (in the form of a server) 104 and a plurality of receivers (in the form of content clients) 108, 110 and 112 separated by a communication network 106. The network 106 could be a wireless network, a wired network, or a combination of a wired and wireless network. The network 106 could be (or could form part of) a distributed computing network, such as the internet.

The content server 104 is shown communicatively coupled to a content generator 102. The content generator 102 may be configured to encode media content and to communicate the media content to the content server 104. As described above, the media content could comprise video and/or audio streams. The content generator 102 may be configured to encode the video stream separately at multiple different bit rates to generate multiple encoded video streams each encoded at a different bit rate. The video content could for example be encoded according to the ITU-T H.264 standard, though other standards may also be used. If the media content additionally comprises audio content, then this may be encoded at only a single bit rate (to generate a single encoded audio stream) or at multiple bit rates to generate respective encoded audio streams. One example of the standard for encoding the audio stream is MPEG-4 HE AAC, but other standards may alternatively be used. The content generator 102 may also be configured to segment the media content into a plurality of discrete temporal segments, which as described above are typically between 2 s and 15 s in duration. If the media content was encoded at multiple bitrates, each encoded stream may be segmented. The, or each, content stream could be segmented before or after encoding. That is, a content stream may be segmented, with each resulting segment then encoded at different bit rates; or each encoded content stream could be segmented to generate a plurality of encoded segments.

The content server 104 is configured to receive media content from content generator 102 and may store the received content. As indicated above, the media content received by the content generator 102 may be encoded and segmented. The content server may communicate, or deliver, the media content to one or more of the clients 108, 110 and 112 via the network 106. The content server 104 could be a video streaming server, and may deliver video (and/or audio) content on request to the clients. Thus, the client devices 108, 110 and 112 may be adapted to request media content from the server 104. The client devices could for example be a suitably configured set-top box, PC, laptop, smartphone, tablet, smart TV, etc.

Figure 2:
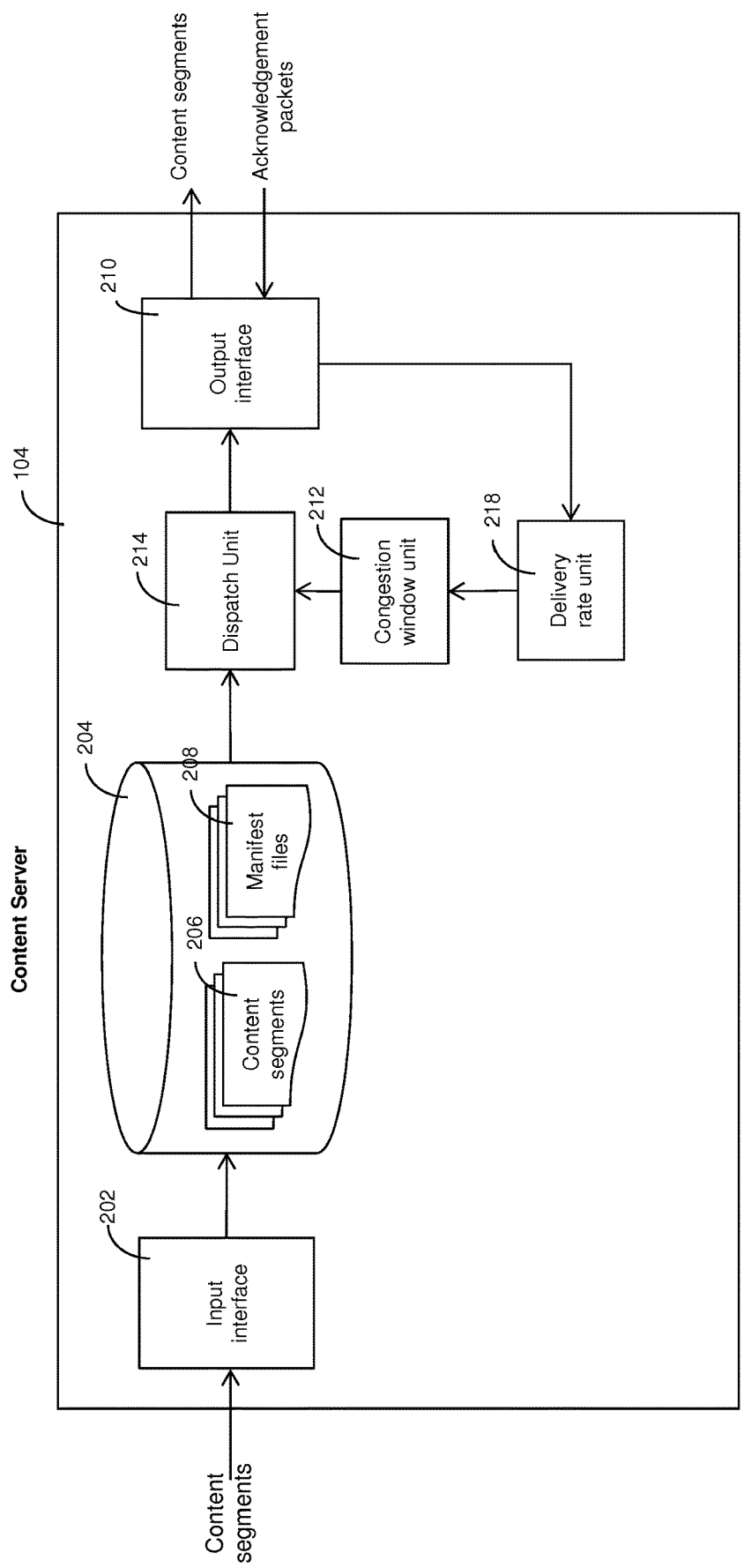
FIG. 2 shows an example of a server forming part of the network in FIG. 1.

An example of the server 104 is shown in more detail in FIG. 2. The server comprises an input interface 202; a data store 204 and an output interface 210. The server further comprises a congestion window unit 212, a dispatch unit 214 coupled to the output interface 210, and a delivery rate unit 218. The content server 104 may be configured to receive the encoded content segments from the content generator at the input interface 202 and to store the received encoded segments 206 in the data store 204. Each content segment may be associated with a manifest file 208 that may contain information on the bit rates at which the associated content segment was encoded, and an indication of where the associated content segment is stored within the store 204 of the server. Each manifest file may also optionally store an indication of the duration of the media content encoded in the associated content segment. The manifest files may also be stored in the store 204. Each content segment is transmitted from the server via the output interface 210 as a plurality of data packets. That is, each segment of content data is formed of a plurality of data packets. The number of data packets that make up a content segment can vary and depends on a number of factors as described earlier. The content server 104 may also receive via the output interface 210 acknowledgement packets from one or more content clients to which the server has transmitted data packets. The communication system may be arranged so that the content server receives an acknowledgement packet for each data packet successfully delivered to a client over the network. The operation of the congestion window unit 212, dispatch unit 214, and delivery rate calculator 218 will be described later with reference to FIG. 4.

Figure 3:
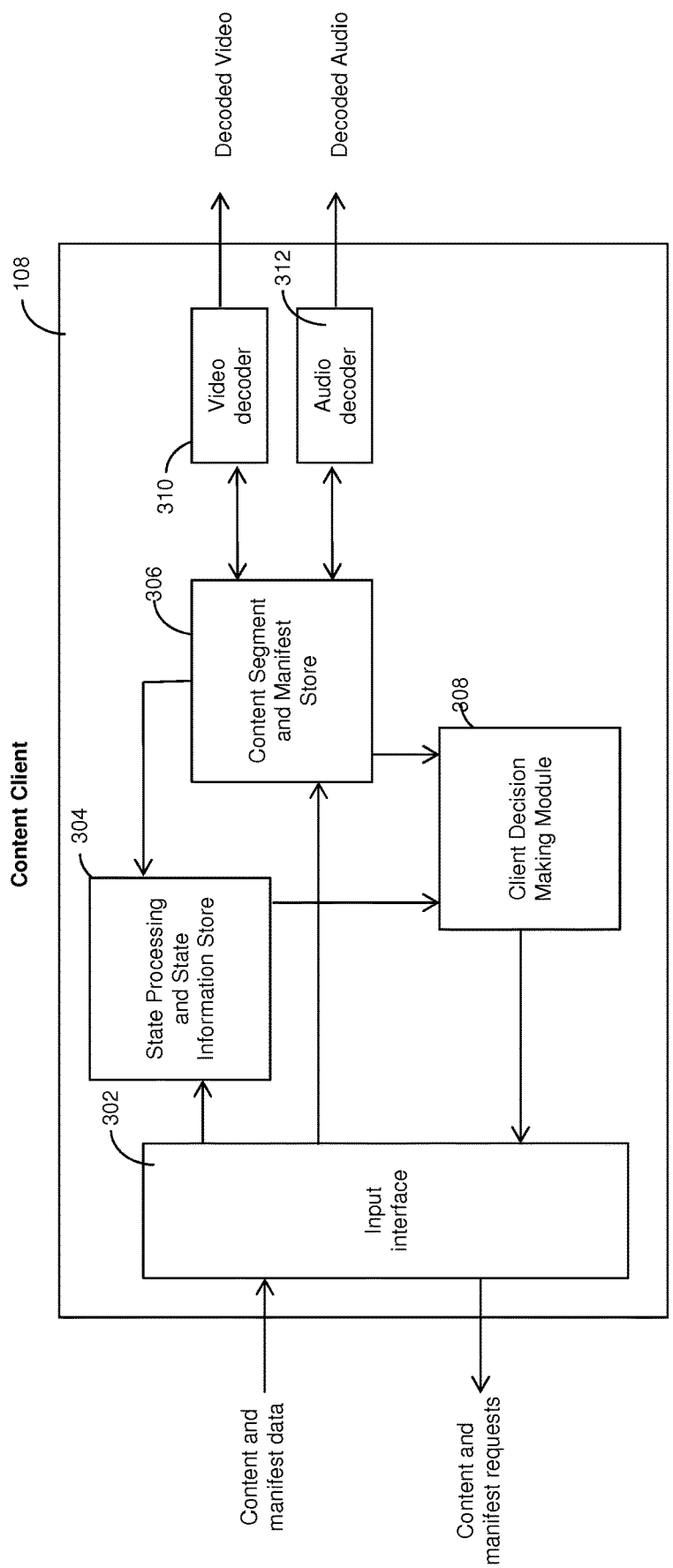
FIG. 3 shows an example of a client forming part of the network in FIG. 1.

An example of a content client (in this case, client 108) is shown in more detail in FIG. 3. In this example, the client 108 comprises an input interface 302; a state processing and state information store 304; a client decision making module 308; a content segment and manifest store 306 and a media content decoder, in this example in the form of a video decoder 310 and an audio decoder 312.

The client 108 initiates a request for content delivery by communicating a request to the server 104 for a manifest file associated with the desired content segment via the interface 302. In response to receiving the requested manifest file from the server 104, the client 108 stores the file in the content segment and manifest store 306. The decision-making module 308 analyses the manifest file and in response issues a request for a content segment at a specified encoded bit rate from the server 104. The request is communicated to the server 104 from the client 108 via the interface 302. In response to receiving the request, the server 104 delivers the requested content segment, in the form of a series of data packets, over the network 106 to the client 108. The client 108 receives the content segment (in the form of a series of data packets) through its interface 302 and passes it to the content segment and data store 306. Received content segments are passed to the media decoders 310 and 312. The decoders 310 and 312 perform decoding operations on the content segment and output the decoded media content (i.e. decoded audio and/or video content) for presentation to a user. Once a content segment has been decoded, it may be removed from the segment store 306. The client 108 may additionally transmit an acknowledgment packet over the network 106 back to the server for each data packet received. The acknowledgement packets may be transmitted via the client's interface 302.

The state processing and information store 304 may monitor one or more state parameters indicative of the state of the delivery of the media content from the server 104. These parameters may include one or more of: the rate at which content data is received at the interface 302; the rate at which content is decoded and presented to a user via the media decoders; and the amount of (not yet decoded) content segment data stored in the segment and manifest store 306.

The client decision making module 308 may determine the next requested content segment and the encoded bit rate of that segment in dependence on an analysis of the associated manifest file for that segment and the state parameters determined by the state processing store 304.

The media content requests issued by the client 108 to the server 104 may be HTTP requests (e.g. HTTP GET requests). A request may be issued for each segment of media data.

Though only client 108 has been described above in more detail, it will be appreciated that clients 110 and 112 may have the same components as client 108 and operate in an analogous way.

The operation of the server 104 when delivering segments of media data over the communication network 106 in accordance with the present invention will now be described with reference to the flow chart of FIG. 4. In this example, the server is delivering media content over the network to client 108.

The following steps will be described with reference to a segment of content referred to as a 'first segment'. This first segment need not be the first segment in a streaming session between the server and client, and may refer to any segment being communicated as part of a streaming session. The first segment may be any segment scheduled for delivery to the client at a time when the implemented TCP protocol has completed its standard slow start process or some other similar process initiated at the start of a streaming session from the server to the client. The segment may have been requested for delivery by one of the clients (e.g. client 108) in the manner described above as part of a streaming session between the server and client.

At step 400, the segment index n is set to '1' to refer to the first segment for delivery to the client over the network 106. A segment can comprise one or more contiguous portions, and examples of the invention describe methods for delivering segments of a media sequence within a specified time interval by adjusting the congestion response following delivery of a portion of each segment.

At step 402, the time interval, $\Delta T_n$, is set for delivering segment n to the client 108 over the network 106. The time interval can also be considered as a deadline for delivery of a segment. The concept of deadline driven delivery (DDD) is discussed in the Applicant's International application WO2014/155031. The delivery deadline can be set according to the application's requirements. For example, a delivery deadline may be set to a relatively short time (i.e. a short time interval) in the future for content streaming applications where content needs to be delivered within a certain time to prevent play-out stalling. Conversely, for a file download, where a user does not require a file urgently, the delivery deadline may be set well into the future (i.e. a long time interval).

The time interval for delivering the content segment to the client 108 over the network 106 may be specified by the client. For example, the client may append to the server request for a content segment an indication of the time by which delivery of that segment is desired. Alternatively, the time interval for delivery may be specified by the server 104. The server may specify the time interval for delivery based on a consideration of delivering the media content as a whole to the client 108 in a timely fashion with minimal latency. This type of content delivery, in which the server specifies the time interval for delivery of a content segment, may be referred to as HTTP push, with the server 104 being said to implement an HTTP push mechanism.

In step 404, a congestion window CWND(n) for delivery of segment n is calculated using the time interval $\Delta T_n$. For clarity, first congestion window as referred to in this example will be denoted $CWND_1$. As used herein, the size of a congestion window may be specified in terms of a number of packets, or in terms of bytes.

The initial size of the first congestion window may be equal to the size of the congestion window immediately following the completion of an initial slow start process. That is, the initial size of the congestion window may be equal to the size of the congestion window at the beginning of a congestion avoidance phase of the TCP protocol.

Alternatively, the initial size of the first congestion window $CWND_1$ may be determined by the congestion window unit 212 in dependence on the size of the first segment and the time interval $\Delta T_n$ for delivering the first segment. The 'size' of the first segment may refer to the amount of data (e.g. in bits, bytes, etc.) in the first segment.

To see how the initial size of the first congestion window $CWND_1$ can be calculated based on a specified time interval for delivery of the first segment, consider the following model in which the data packet delivery rate $R_{TCP}$ that could be achieved through network 106 using a TCP protocol is approximated as:

$$R_{TCP} = \frac{CWND}{RTT} \quad (1)$$

where CWND is the congestion window size (in numbers of packets or in bytes) and RTT is the round-trip time (i.e. the time interval between the time of transmission from the server of a packet into the network and the time of receipt at the server of an acknowledgement of that packet from the client). Thus $R_{TCP}$ may have units of packets per second, or bytes per second depending on the units used to define the size of the congestion window.

If D represents the size of a segment (again, in terms of bytes or the number of packets forming the segment), and the time interval for delivering the segment is $\Delta T_n$, then the minimum data packet delivery rate $R_{req}$ for timely delivery of that segment is given by:

$$R_{req} \geq \frac{D}{\Delta T_n} \quad (2)$$

By equating the data packet delivery rates in equations (1) and (2) and rearranging in terms of the congestion window size, we can derive the following requirement for the congestion window size required to ensure timely delivery of a segment within the time interval $\Delta T_n$ as:

$$CWND \geq RTT \times \frac{D}{\Delta T_n} \quad (3)$$

By substituting $CWND_1$ for CWND, and $\Delta T_1$ for $\Delta T_n$, we get the congestion window size required to ensure timely delivery of the first segment within the time interval $\Delta T_1$:

$$CWND_1 \geq RTT \times \frac{D}{\Delta T_1} \quad (4)$$

The initial size of the first congestion window can also be calculated in accordance with equation (4) in dependence on the measured RTT, the size of the segment D, and the time interval $\Delta T_1$ that has been set.

Once an initial size of the first congestion window has been calculated, then at step 406 the server 104 starts to deliver the first segment to the client 108 over the network 106 using the first congestion window $CWND_1$. Delivery of the content segment is controlled by the dispatch unit 214, which causes the data packets that make up the (first) segment to be transmitted over the network via the server's output interface 210. Note, equation (4) sets out a minimum value for the congestion window $CWND_1$, and thus the congestion window used for delivery should be no less than this minimum value for the duration of the delivery of the first segment, even when a packet loss is detected.

This contrasts with content delivery using conventional TCP implementations in which, following a packet loss, it is typical for the size of the congestion window (or the threshold size of the congestion window) to be approximately halved from its value immediately preceding the packet loss in accordance with a congestion avoidance mechanism known as additive increase multiplicative decrease.

When the congestion window size is set in this manner, the delivery of a content data segment is more predictable and should be completed within the time interval $\Delta T_1$ even when faced with packet loss.

However, equation (4) is an approximation for a number of reasons. For example, high levels of packet loss will cause many packets to be lost and need to be retransmitted, effectively reducing the rate at which data comes out of the network for a fixed rate going in. Hence there is a possibility that a content data segment may not be delivered within the time interval even if the contention window is set according to equation (4). Indeed, equation (1) merely sets out an upper bound on the throughput that could be achieved.

Hence, at any stage during delivery of a segment, a check can be made to determine if the entire segment has been delivered, and if not, the actual delivery rate, $R_{measured}$, of the first portion of the segment is measured by the server 104. Examples of the invention then calculate an updated congestion window size $CWND_{target}$ used for delivery of the remainder of the segment to meet the time interval requirement for the segment. This updated congestion window is required if the measured rate $R_{measured}$ was not fast enough to deliver the segment within the time interval $\Delta T_1$ due to excessive packet loss.

The discussion below sets out one example in which segment delivery can be assessed, and the extent of corrective action, in the form of an updated congestion window, determined.

The rate at which data is being delivered is measured and compared to the rate required to meet the time interval. The ratio of these, F, is calculated as below in equation (5), where $R_{TCP}$ is the theoretical throughput, as set out in equation (1) above, and $R_{measured}$, the measured delivery rate:

$$F = \frac{R_{TCP}}{R_{measured}} \quad (5)$$

Substituting for $R_{TCP}$ from equation (1) into equation (5) leads to the following:

$$F = \frac{CWND}{RTT \times R_{measured}} \quad (6)$$

The delivery rate, $R_{req}$, required to ensure that the content data segment is delivered by the deadline is calculated as below in terms of the amount of data within the content data segment remaining to be delivered, $D_{remaining}$, and the time interval remaining (or time until delivery deadline) following delivery of packets to date, $\Delta T_d$.

$$R_{req} = \frac{D_{remaining}}{\Delta T_d} \quad (7)$$

Note, $\Delta T_d$ is effectively equal to $\Delta T_n$ minus the time elapsed since delivery commenced.

Then, assuming that the ratio, F, applies between the theoretical delivery rate required and the actual delivery rate achievable, the target delivery rate, $R_{target}$, for the remainder of the content data segment can be represented as:

$$R_{target} = F \times R_{req} \quad (8)$$

Combining equations (7) and (8) gives $R_{target}$ as a function of the data remaining to be delivered, $D_{remaining}$, and the time interval remaining $\Delta T_d$:

$$R_{target} = F \times \frac{D_{remaining}}{\Delta T_d} \quad (9)$$

Using equation (1), the updated congestion window size, $CWND_{target}$ can be written as function of the target delivery rate $R_{target}$ as follows:

$$CWND_{target} = RTT \times R_{target} \quad (10)$$

Equations (9) and (10) can be combined to express the updated congestion window size, $CWND_{target}$, as:

$$CWND_{target} = RTT \times F \times \frac{D_{remaining}}{\Delta T_d} \quad (11)$$

Equation (11) can be combined with equation (6) and simplified to express the updated congestion window $CWND_{target}$ as:

$$CWND_{target} = \frac{CWND}{R_{measured}} \times \frac{D_{remaining}}{\Delta T_d} \quad (12)$$

Where CWND is the initial congestion window $CWND_1$, $R_{measured}$ is the measured delivery rate, $D_{remaining}$ the amount of data within the content data segment remaining to be delivered, and $\Delta T_d$ the remaining time interval remaining for delivery of the content data segment remaining to be delivered.

Thus, using an updated congestion window $CWND_{target}$ calculated according to equation (12), the remaining portion of the segment can be delivered such that the entire segment is delivered within the original time interval $\Delta T_n$.

Therefore, in examples of the invention, the server 108 intermittently measures the delivery rate that is being achieved, either over the whole segment or over a portion of it, or calculates another measure of achieved throughput, such as a weighted average biased towards more recently delivered packets, and performs the above calculation using this measured delivery rate and knowledge of the current congestion window size, the amount of content segment data still to be delivered and the time until the deadline in which to deliver it, and adjusts the congestion window accordingly.

Figure 4:
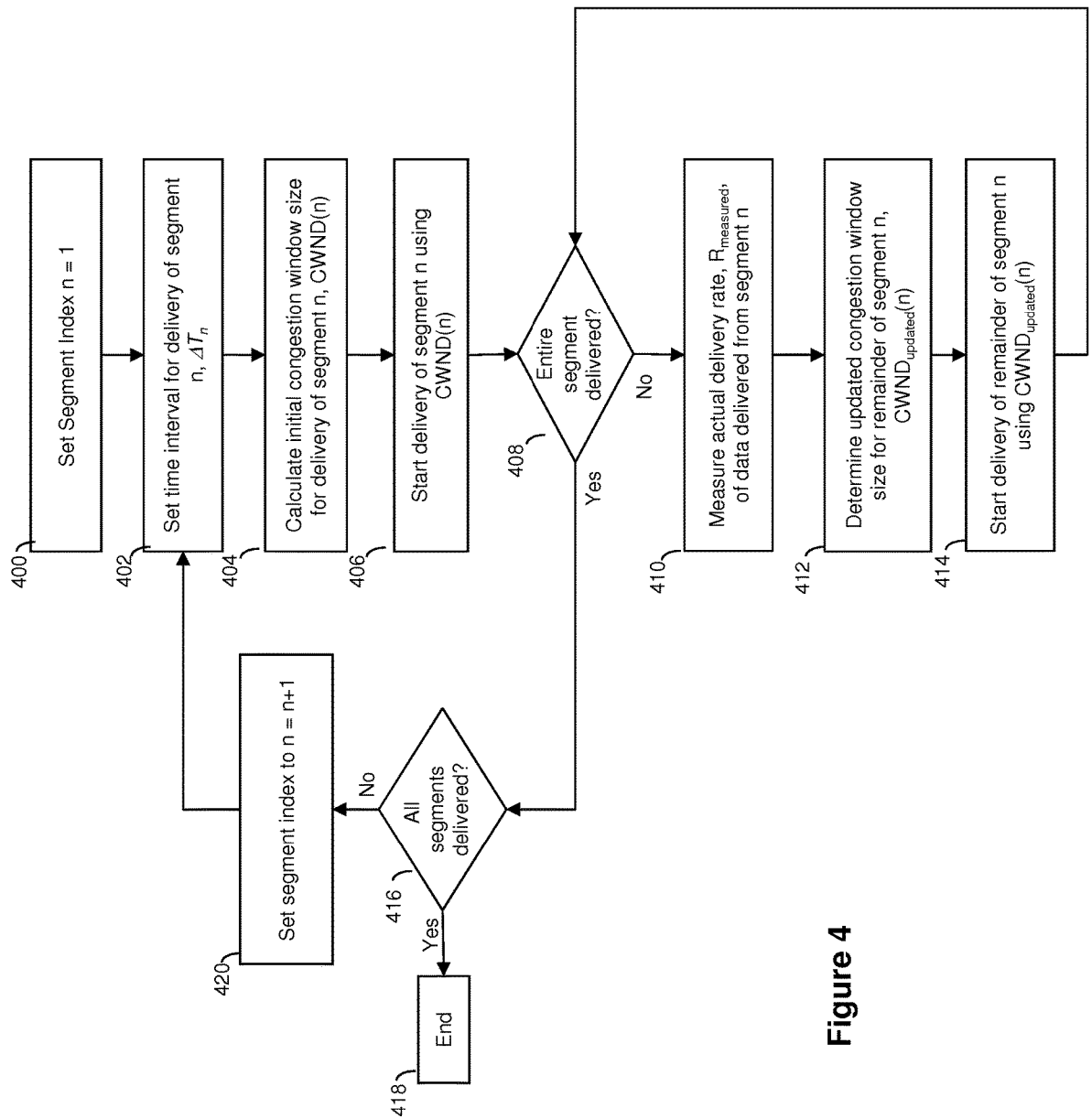
FIG. 4 is a flowchart summarising the steps for a method of delivering media content over a network.

Turning back to the flow chart of FIG. 4, sometime after delivery of the segment has started in step 406, a check is made to determine whether the entire segment has been delivered in step 408. If the entire segment has been delivered, the processing passes to step 416. However, for now, we assume that the entire segment has not been delivered, and processing passes to step 410.

In step 410, the delivery rate unit 218 measures the actual delivery rate, $R_{measured}$, for the portion of segment n delivered so far (note, at this point the entire segment has not been delivered yet).

Then in step 412, the congestion window unit 212 calculates an updated congestion window, $CWND_{updated}$, as described in the examples above, and specifically shown in equation 12. This updated congestion window is used to deliver the remainder of segment n. Thus in step 414, the server 104 starts delivery of the remainder of the first segment to the client 106 using the updated congestion window, $CWND_{updated}$.

Processing then cycles back to step 408, where a check is again made to determine if the entire segment has been delivered. If it hasn't then steps 410 to 414 are repeated until the segment has been delivered. Thus, further updated congestion windows are calculated based on the previously calculated congestion window, and used for delivery of the segment until the entire segment has been delivered.

Once the entire segment has been delivered, processing passes from step 408 to step 416. In step 416, a further check is made to determine if all the segments of the media content have been delivered. If the segments have all been delivered, then processes ends with step 420 and the streaming session is complete. If the segments haven't all been delivered, processing passes onto step 422, where the segment index n is incremented by 1 to n+1, before processing passes back to step 402 to process this next segment, and repeats until all segments have been delivered.

The examples above have been described in the context of delivering media content over a network using adaptive bit rate delivery and an underlying TCP protocol. However, it will be appreciated that the present invention is not limited to adaptive bit rate protocols, but may be implemented in various communication systems in which content is delivered in segments and a form of congestion control for traffic over the network is implemented.

The above examples have been described in the context of a server delivering segments of media content to a client over a network. The server could be an origin server, a content delivery network (CDN) node or a residential gateway device, for example. More generally, the functions of the server described herein may be implemented by a suitably configured transmitter for delivering media content over the network. The clients may be HTTP adaptive bit rate streaming clients. The clients may be adapted to support MPEG DASH, HLS, SmoothStreaming or some other adaptive bit rate streaming protocol. More generally, the clients may be any suitable configured receiver for receiving media content over a network.

The examples above have been described with reference to a 'first segment' and a 'second segment'. The terms 'first' and 'second' have been used as labels for the purposes of clarity and illustration and do not imply either a relative temporal order of the segments within a content stream nor the temporal positions of the segments within the content stream. For example, the 'first segment' need not be the first segment to be delivered in a streaming session but may refer to any non-final segment delivered as part of a content stream. It may refer to a segment being delivered once the underlying TCP protocol has completed a fast start process at the initiation of a streaming session (for example, if the underlying TCP protocol were TCP New Reno or TCP Cubic). The first segment could alternatively refer to a segment delivered during the fast start process, or some other similar process. It will therefore be appreciated from the foregoing that the initial size of the first congestion window as described at step 404 may be selected by the congestion window unit 212 in dependence on the measured packet loss for a preceding segment delivered prior to the first segment. That preceding segment may be the segment delivered immediately prior to the first segment or some other preceding segment separated from the first segment in the content stream by one or more intermediary segments.

The server and clients described herein and illustrated in FIGS. 2 and 3 are described and shown as comprising one or more of an input interface and output interface. The terms "input" and "output" are not being used to limit an interface to either solely receiving or transmitting data, but may refer to a direction with which the interface exchanges data with the network. For example, an input interface of the server may be an interface to the content generator; and the output interface of the server may be the interface to the downstream network (e.g. network 106). The input interface of the client (which may be downstream of the server) may be an interface to the upstream network (e.g. network 106). More generally, the input and output interfaces may be referred to as "first" and "second" interfaces. In some implementations, a server and/or client may have a single interface in the form of an input/output interface.

Generally, any of the functions, methods, techniques or components described above for the components of the communication system can be implemented in software, firmware, hardware (e.g., fixed logic circuitry), or any combination thereof. The terms "unit", "detector" and "calculator" as used herein may generally represent software, firmware, hardware, or any combination thereof. In the case of a software implementation, the unit, detector and calculator represent computer program code or computer readable instructions that perform the specified tasks when executed on a processor. The algorithms and methods described herein could be performed by one or more processors executing code that causes the processor(s) to perform the algorithms/methods. The computer program code may be stored on a non-transitory computer-readable storage medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of delivering media content over a network, said media content comprising a plurality temporal segments, and each temporal segment comprising a plurality of data packets, said method comprising:
   determining a time interval for delivery of a segment;
   calculating an initial congestion window size for the delivery of the segment, wherein said initial congestion window is dependent on the time interval;
   delivering a first portion of the segment using the initial congestion window;
   measuring a first rate for the delivery of the first portion of the segment;
   calculating an updated congestion window size in dependence on the initial congestion window size, the first rate, an amount of data in the segment remaining to be delivered, and a time remaining for delivery of the segment; and
   delivering a further portion of the segment using the updated congestion window size.

2. A method as claimed in claim 1, wherein all of the plurality of data packets in the first portion of the segment are delivered using the initial congestion window.

3. A method as claimed in claim 1, wherein the first rate is an average delivery rate over the first portion.

4. A method as claimed in claim 1, wherein the first rate is a weighted average of a delivery rate biased towards more recently delivered packets.

5. A method as claimed in claim 1, wherein the time remaining for delivery of the segment is the time interval minus a time taken to deliver the first portion.

6. A method as claimed in claim 1, wherein the updated congestion window size, $CWND_{target}$, is given by:

$$CWND_{target} = \frac{CWND}{R_{measured}} \times \frac{D_{remaining}}{\Delta T_d}$$

where CWND is the initial congestion window size, $R_{measured}$ is the first rate, $D_{remaining}$ is the amount of data in the segment remaining to be delivered, and $\Delta T_n$ the time remaining for delivery of the segment.

7. A server for delivering media content over a network, said media content comprising a plurality temporal segments, and each temporal segment comprising a plurality of data packets, said server comprising:
   a computer processor;
   a memory device;
   a dispatch unit configured to determine a time interval for delivery of a segment;
   a congestion window unit configured to calculate an initial congestion window size for the delivery of the segment, wherein said initial congestion window is dependent on the time interval;

the dispatch unit further configured deliver a first portion of the segment using the initial congestion window;

a delivery rate unit configured to measure a first rate for the delivery of the first portion of the segment;

wherein the congestion window unit is further configured to calculate an updated congestion window size in dependence on the initial congestion window size, the first rate, an amount of data in the segment remaining to be delivered, and a time remaining for delivery of the segment, wherein the dispatch unit is further configured to deliver a further portion of the segment using the updated congestion window size; and wherein the dispatch unit, the congestion window unit, the delivery rate unit are stored on said memory device and executed by said computer processor.

8. The server as claimed in claim 7, wherein all of the plurality of data packets in the first portion of the segment are delivered using the initial congestion window.

9. The server as claimed in claim 7, wherein the first rate is an average delivery rate over the first portion.

10. The server as claimed in claim 7, wherein the first rate is a weighted average of a delivery rate biased towards more recently delivered packets.

11. The server as claimed in claim 7, wherein the time remaining for delivery of the segment is the time interval minus a time taken to deliver the first portion.

12. The server as claimed in claim 7, wherein the updated congestion window size, $CWND_{target}$, is given by:

$$CWND_{target} = \frac{CWND}{R_{measured}} \times \frac{D_{remaining}}{\Delta T_d}$$

where CWND is the initial congestion window size, $R_{measured}$ is the first rate, $D_{remaining}$ is the amount of data in the segment remaining to be delivered, and $\Delta T_n$ the time remaining for delivery of the segment.

13. A server for delivering media content over a network, said media content comprising a plurality temporal segments, and each temporal segment comprising a plurality of data packets, the server comprising:

a computer processor and storage memory storing executable code which upon execution by the computer processor configures the server to:

determine a time interval for delivery of a segment;

calculate an initial congestion window size for the delivery of the segment, wherein the initial congestion window is dependent on the time interval;

deliver a first portion of the segment using the initial congestion window;

measure a first rate for the delivery of the first portion of the segment;

calculate an updated congestion window size in dependence on the initial congestion window size, the first rate, an amount of data in the segment remaining to be delivered, and a time remaining for delivery of the segment; and deliver a further portion of the segment using the updated congestion window size.

14. The server as in claim 13, wherein all of the plurality of data packets in the first portion of the segment are delivered using the initial congestion window.

15. The server as in claim 13, wherein the first rate is an average delivery rate over the first portion.

16. The server as in claim 13, wherein the first rate is a weighted average of a delivery rate biased towards more recently delivered packets.

17. The server as in claim 13, wherein the time remaining for delivery of the segment is the time interval minus a time taken to deliver the first portion.

18. The server as in claim 13, wherein the updated congestion window size, $CWND_{target}$, is given by:

$$CWND_{target} = \frac{CWND}{R_{measured}} \times \frac{D_{remaining}}{\Delta T_d}$$

where CWND is the initial congestion window size, $R_{measured}$ is the first rate, $D_{remaining}$ is the amount of data in the segment remaining to be delivered, and $\Delta T_n$ the time remaining for delivery of the segment.

* * * * *